Patented Aug. 11, 1936

2,050,660

UNITED STATES PATENT OFFICE 2,050,660

N-SUBSTITUTION PRODUCTS OF 1.4-DIAMINOANTHRAQUINONES

Karl Koeberle, Christian Steigerwald, and Robert Schweizer, Ludwigshafen-on-the-Rhine, Germany, assignors to General Aniline Works, Inc., New York, N. Y., a corporation of Delaware No Drawing. Application October 22, 1935, Serial No. 46,206. In Germany September 19, 1933

9 Claims. (Cl. 260—60)

The present invention relates to N-substitution products of 1,4-diaminoanthraquinones. This application is a continuation-in-part of our application Ser. No. 743,481.

We have found that 1.4-diaminoanthraquinones corresponding to the general formula

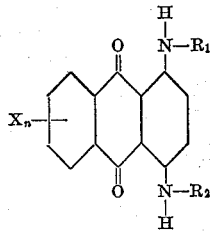

wherein $R_1$ and $R_2$ are different from each other and stand for alkyl, aralkyl or cycloalkyl radicles, X for —OH, —O-alkyl, —$NH_2$ or —NH-alkyl, and $n$ for a whole number up to 2, are valuable compounds which are in part suitable for dyeing cellulose esters and ethers and in part valuable intermediate products for the preparation of dyestuffs.

The said compounds may be obtained by various methods.

A. For example, they may be prepared according to the process described in the above mentioned application Ser. No. 743,481 by causing at least 2 molecular proportions of a mixture of 2 different primary alkyl, aralkyl or cycloalkyl amines to act on the leuco derivative of a compound corresponding to the general formula:

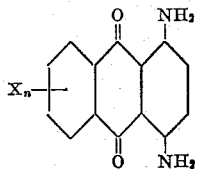

wherein X stands for —OH, —O-alkyl, —$NH_2$ or —NH-alkyl, and $n$ for a whole number from 1 to 2.

Instead of the leuco derivative the compounds of the said general formula themselves may be employed, the reaction being carried out in the presence of a reducing agent.

B. Another method for the preparation of the said compounds consists in treating a compound of the general formula

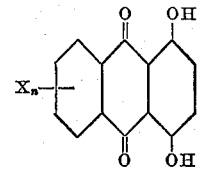

wherein X stands for —OH—, —O-alkyl, —$NH_2$ or —NH-alkyl, and $n$ for a whole number from 1 to 2, in the form of its leuco derivative, or in treating it in the presence of a reducing agent with at least 2 molecular proportions of a mixture of 2 different alkyl, aralkyl or cycloalkyl amines.

C. Furthermore, a compound corresponding to the general formula

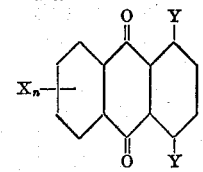

wherein one Y stands for —$NH_2$, the other Y for —OH or —O-alkyl, and X for —OH, —O-alkyl, —$NH_2$ or —NH-alkyl, and $n$ for a whole number from 1 to 2, may be reacted in the form of its leuco derivative or in the presence of a reducing agent with at least 2 molecular proportions of 2 different alkyl, aralkyl or cycloalkyl amines.

D. Finally, a compound of the general formula

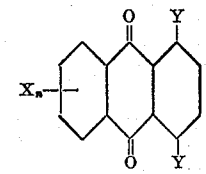

wherein the Y's may be equal or different and may stand for —OH, —O-alkyl or —$NH_2$, X for —OH, —O-alkyl, —$NH_2$ or —NH-alkyl, and $n$ for a whole number from 1 to 2, may be reacted with at least 2 molecular proportions of 2 different primary alkyl, aralkyl or cycloalkyl amines in the presence of the corresponding leuco derivative.

As starting materials for the process A, leuco-1,4-diamino-5-hydroxyanthraquinone, leuco-1,4-diamino-5,8-dihydroxyanthraquinone, leuco-1,4-diamino-5,6-dihydroxyanthraquinone, leuco-1,4,5-triaminoanthraquinone, leuco-1,4,5,8-tetraaminoanthraquinone and leuco-1,4-diamino-5-amino-8-methoxyanthraquinone may be mentioned by way of example. Instead of the leuco compounds, the said 1,4-diaminoanthraquinones themselves may be employed in the presence of a reducing agent. As reducing agents especially suitable for the purpose of this process sodium hydrosulphite and zinc dust may be mentioned.

As starting materials for the processes B and C, leuco-1,4,5,8-tetrahydroxyanthraquinone, leuco-1,4,5,6-tetrahydroxyanthraquinone, leuco-1,4,5-trioxyanthraquinone, leuco-1,4-dihydroxy-5-aminoanthraquinone, leuco-1,4-dihydroxy-5,8-diaminoanthraquinone and leuco-1-amino-4-hydroxy-5,8-dihydroxyanthraquinone, leuco-1-hydroxy-4-amino-5-amino-8-hydroxyanthraquinone and leuco-1-amino-4-methoxy-5-amino-8-methoxy-anthraquinone respectively may be mentioned.

As starting materials for the process D, the compounds corresponding to the leuco compounds referred to in the preceding paragraph can be employed.

Primary amines of the kind defined above suitable for the purpose of the present invention, are for example methyl amine, ethyl amine, propyl amines, butyl amines, amyl amines, hexyl amines, ethanol amine, the propanol amines, butanol amines, benzyl amine, phenylethyl amine, cyclohexyl amine, ω-monomethylnaphthalene, 1,2,3,4-tetrahydroaminonaphthalenes, ethylenediamine, monohydroxyethyl and monophenylethylenediamine. The components for the mixture of amines to be employed may be chosen by grouping together any one of the amines mentioned hereinbefore.

All the processes described above can be carried out in the presence of diluents. For this purpose water, aliphatic alcohols of low molecular weight (especially methanol, ethanol and butanols), cyclohexanol, liquid ketones such as acetone ethers or esters, may be mentioned. In some cases, especially if the amine employed has a low boiling point, it is preferable to work under superatmospheric pressure.

In some cases the reaction products are obtained wholly or partly in the form of their leuco derivatives which can be oxidized in known manner, for example by leading air or oxygen through the boiling reaction mixture, preferably in the presence of copper or copper salts, such as copper acetate, and in the presence of a little amount of secondary or tertiary organic bases, such as dimethyl aniline or piperidine.

It is also possible to employ sodium chlorate, sodium perborate or a nitro compound of an aromatic hydrocarbon of the benzene series as the oxidizing agent.

The reaction products according to the present invention are generally obtained in a state of good purity and in good yields. If desired, they may be purified by recrystallization or sublimation. They may be in part employed for dyeing cellulose esters and ethers, for coloring hydrocarbons, paraffin, waxes, fats, oils, for the preparation of lacquers, or for coloring artificial masses of various kind, and in part for the preparation of other dyestuffs.

The following examples will further illustrate how the said invention may be carried out in practice. The invention, however, is not restricted to these examples. The parts are by weight.

*Example 1*

A mixture of 54.8 parts of leuco-1,4,5,8-tetrahydroxyanthraquinone, 16.5 parts of 1,2-propanolamine, 14.4 parts of ethanolamine and 500 parts of isobutyl alcohol is heated while stirring at about 100° C. until initial material can no longer be detected. After adding 1 part of copper acetate and 6 parts of piperidine air is led through the boiling mixture until it has assumed a blue-green coloration. After cooling the 1-hydroxyethylamino-4'-beta-hydroxypropylamino-5,8-dihydroxyanthraquinone formed is filtered off by suction, washed with methanol and dried. It is a blue powder which dyes acetate artificial silk powerful blue-green shades having very good properties as regards fastness.

The same compound can be obtained by starting from leuco-1.4-diamino-5.8-dihydroxyanthraquinone.

*Example 2*

A mixture of 54.8 parts of leuco-1,4,5,8-tetrahydroxyanthraquinone, 16.5 parts of 1,2-propanolamine, 16.5 parts of 1,3-propanolamine and 500 parts of isobutylalcohol is heated for two hours at about 100° C. while stirring. After oxidation in the manner described in Example 1 the 1-beta-hydroxypropylamino-4-gamma-hydroxypropylaminoanthraquinone formed is filtered off by suction, washed with methanol and dried. It forms blue needles which dye acetate artificial silk powerful blue-green shades.

In a corresponding manner 1-hydroxyethylamino-4-gamma-hydroxypropylaminoanthraquinone is obtained if the 1,2-propanolamine is replaced by 14.4 parts of ethanolamine. The said compound also dyes acetate artificial silk powerful blue-green shades.

*Example 3*

A mixture of 54.8 parts of leuco-1,4,5,8-tetrahydroxyanthraquinone, 30 parts of a 25 per cent aqueous solution of methylamine, 16 parts of normal-butylamine and 500 parts of ethanol is heated for two hours to boiling while stirring. After cooling, the resulting leuco compound which has a brown-red color is filtered off by suction, washed with methanol and dried. It is then suspended in 500 parts of nitrobenzene and the mixture is heated after the addition of 5 parts of piperidine while stirring for 5 hours at 150° C. After cooling the 1-methyl-amino-4-normal-butylamino-5,8-dihydroxyanthraquinone is filtered off by suction, washed with methanol and dried. It forms blue crystals.

*Example 4*

A mixture of 54.8 parts of leuco-1,4,5,8-tetrahydroxy-anthraquinone, 13 parts of normal-propylamine, 17 parts of normal-butylamine and 500 parts of ethanol is heated while stirring for two hours to boiling. After cooling, the leuco compound formed is washed with methanol, dried and oxidized with nitrobenzene in the manner described in Example 3. The reaction product is 1-normal-propylamino-4-normal-butylamino-5,8-dihydroxyanthraquinone.

*Example 5*

A mixture of 50 parts of 1,4,5-triaminoanthraquinone, 60 parts of sodium hydrosulfite, 60 parts of a 25 per cent aqueous solution of methylamine, 30 parts of ethanolamine, 800 parts of methanol and 300 parts of water is heated while stirring for 5 hours to boiling. After the addition of 1 part of copper acetate and 6 parts of piperidine air is led through the boiling mixture until a sample has become soluble in methanol giving a blue-green coloration. After cooling, the reaction product is filtered off by suction, washed with methanol and water and dried. It is a blue powder which dyes acetate artificial silk powerful blue-green shades.

1,4,5-triaminoanthraquinones containing different radicals in the 1- and 4-amino groups are obtained by reacting in a manner corresponding to that described above 1.4.5-triaminoanthraquinones with a mixture of methylamine and 1.2-propanol-amine, methylamine and 1,3-propanol-amine, ethylamine and ethanolamine, normal-propylamine and ethanolamine, normal-butylamine and ethanolamine, benzylamine and ethanolamine or cyclohexylamine and ethanolamine.

Example 6

A mixture of 50 parts of 1,4,5-triaminoanthraquinone, 70 parts of sodiumhydrosulfite, 60 parts of a 25 per cent aqueous solution of methylamine, 32 parts of normal-butylamine, 700 parts of methanol and 250 parts of water is heated while stirring for 5 hours at from 60° to 70° C. After cooling, the yellow needles of the leuco compound formed are filtered off by suction, washed with methanol and dried. After oxidation by means of nitrobenzene in the manner described in Example 3 1-methylamino-4-normal-butylamino-5-aminoanthraquinone is obtained. It dyes acetate artificial silk blue-green shades.

By employing instead of the said mixture of amines a mixture of methylamine and normal-propylamine, methylamine and ethylamine, methylamine and normal-amylamine, ethylamine and normal-propylamine, ethylamine and normal-butylamine, methylamine and benzylamine, methylamine and cyclohexylamine or ethylamine and benzylamine, 1,4,5-triaminoanthraquinones substituted correspondingly in the 1- and 4-amino groups are obtained. These compounds are in part suitable for dyeing acetate artificial silk giving blue-green shades of color.

Example 7

A mixture of 53.6 parts of 1,4,5,8-tetraaminoanthraquinone, 70 parts of sodium hydrosulfite, 60 parts of a 25 per cent aqueous solution of methylamine, 24 parts of normal-propylamine, 800 parts of methanol and 300 parts of water is heated while stirring for 8 hours at from 60° to 70° C. After adding 1 part of copper acetate and 6 parts of piperidine air is led through the boiling mixture until the leuco compound has wholly disappeared. After cooling, the 1-methylamino-4-normal-propylamino-5,8-diaminoanthraquinone formed is filtered off by suction, washed with methanol and dried. It is a blue powder which dyes acetate artificial silk powerful blue shades.

Instead of the mixture of methylamine and normal-propylamine the mixtures of amines may be employed referred to in the second paragraph each of Examples 5 and 6.

Example 8

A mixture of 85 parts of 1,4,5,6-tetrahydroxyanthraquinone, 25 parts of leuco-1,4,5,6-tetrahydroxyanthraquinone, 60 parts of a 25 per cent aqueous solution of methylamine, 30 parts of ethanolamine and 1000 parts of ethanol is heated while stirring for 18 hours at from 60° to 70° C. After cooling, the reaction product is filtered off by suction, washed with ethanol and dried. It is a blue powder which dyes acetate artificial silk greenish-blue shades. It is a 5,6-dihydroxyanthraquinone containing in the 1- and 4-amino groups a methyl and a hydroxyethyl radicle respectively.

Correspondingly substituted compounds are obtained if other aliphatic amines or if aralkyl amines or cycloalkylamines are employed.

Example 9

A mixture of 51.2 parts of leuco-1,4-diamino-5-hydroxy-anthraquinone, 30 parts of a 25 per cent aqueous solution of methylamine, 25 parts of benzylamine and 700 parts of methanol is heated while stirring for 8 hours at from 60° to 70° C. After the addition of 1 part of copper acetate and 7 parts of piperidine, air is led through the boiling mixture until it has become greenish-blue. After cooling, the reaction product is filtered off by suction, washed and dried. It is a 5-hydroxy-anthraquinone containing a methylamino and a benzylamino group in the 1- and 4-positions and dyes acetate artificial silk greenish-blue shades. 1,4-diaminoanthraquinones containing different radicles in the amino groups and a free hydroxy group in the 5-position are obtained if instead of the mixture of methylamine and benzylamine mixtures of the kind referred to in the last paragraphs of Examples 5 and 6 be employed. Instead of leuco-1,4-diamino-5-hydroxyanthraquinone leuco-1,4-dihydroxy-5-hydroxyanthraquinone can be employed. It is also possible to employ 1,3,5-trihydroxyanthraquinone in the presence of a reducing agent such as zinc dust.

Example 10

A mixture of 50 parts of 1,5-diamino-4,8-dihydroxyanthraquinone, 70 parts of sodium hydrosulfite, 60 parts of a 25 per cent aqueous solution of methylamine, 30 parts of ethanolamine, 800 parts of methanol and 200 parts of water is heated while stirring for 7 hours at from 60° to 70° C. After adding 1 part of copper acetate and 6 parts of piperidine air is led through the boiling mixture until the oxidation is completed. After cooling, the resulting 1-methylamino-4-hydroxyethylaminoanthraquinone containing a hydroxy and an amino group in the 5- and 8-position respectively is filtered off by suction, washed with methanol and dried. It dyes acetate artificial silk greenish-blue shades.

The same compound is obtained if leuco-1,4-diamino-5-hydroxy-8-aminoanthraquinone is employed as starting material. The 1,5-diamino-4,8-dihydroxyanthraquinone may also be replaced by 1,8-diamino-4,5-dihydroxyanthraquinone.

Example 11

A mixture of 54 parts of leuco-1,4-diamino-5,6-dihydroxyanthraquinone, 30 parts of a 25 per cent aqueous solution of methylamine, 15 parts of normal butylamine and 400 parts of isobutyl alcohol is heated by stirring for 8 hours at from 60° to 70° C. After the addition of 1 part of copper acetate and 6 parts of piperidine air is led through the boiling mixture until the oxidation is completed. After cooling, the resulting 5,6-dihydroxyanthraquinone containing in the 1- and 4-positions a methylamino and a normal butylamino group respectively is filtered off by suction, washed with methanol and dried. It is a blue powder which dyes acetate artificial silk greenish-blue shades.

What we claim is:—

1. 1,4-diaminoanthraquinones corresponding to the general formula

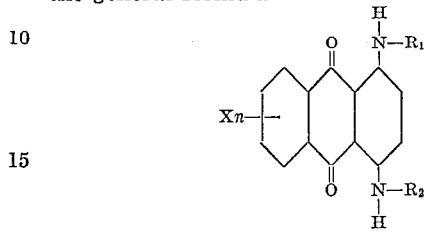

wherein $R_1$ and $R_2$ are different from each other and stand for a member of the group consisting of the alkyl, aralkyl and cycloalkyl radicles and wherein X represents a member of the group consisting of —OH, —O-alkyl, —NH$_2$ and —NH-alkyl groups and $n$ for a whole number from 1 to 2.

2. 1,4-diaminoanthraquinones corresponding to the general formula

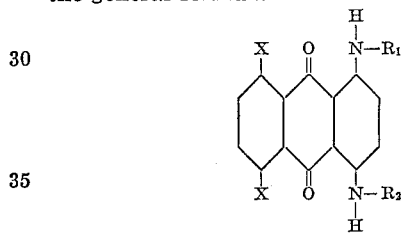

wherein $R_1$ and $R_2$ are different from each other and stand for a member of the group consisting of the alkyl, aralkyl and cycloalkyl radicles and wherein at least one X represents a member of the group consisting of —OH, —O-alkyl, —NH$_2$ and —NH-alkyl groups the other X being hydrogen.

3. 1,4-diaminoanthraquinones corresponding to the general formula

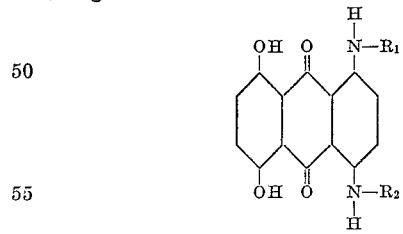

wherein $R_1$ and $R_2$ are different from each other and stand for a member of the group consisting of the alkyl, aralkyl and cycloalkyl radicles.

4. 1,4-diaminoanthraquinones corresponding to the general formula

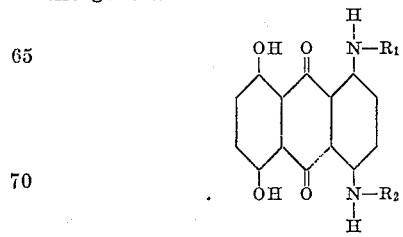

wherein $R_1$ and $R_2$ stand for hydroxyalkyl radicles different from each other.

5. The 1,4-diaminoanthraquinone corresponding to the formula

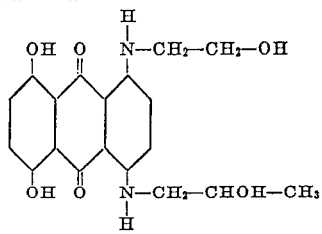

6. 1,4-diaminoanthraquinones corresponding to the general formula

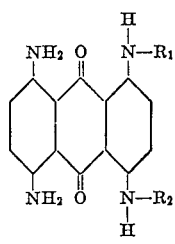

wherein $R_1$ and $R_2$ are different from each other and stand for a member of the group consisting of the alkyl, aralkyl and cycloalkyl radicles.

7. The 1,4-diaminoanthraquinone corresponding to the formula

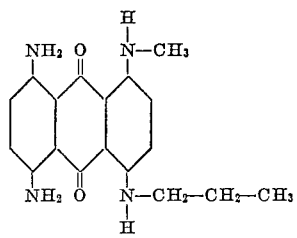

8. 1,4-diaminoanthraquinones corresponding to the general formula

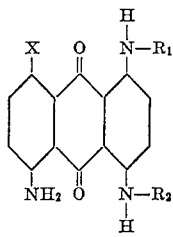

wherein $R_1$ and $R_2$ are different from each other and stand for a member of the group consisting of the alkyl, aralkyl and cycloalkyl radicles and wherein X represents a member of the group consisting of the —OH and —NH$_2$ groups.

9. The 1,4-diaminoanthraquinone corresponding to the formula

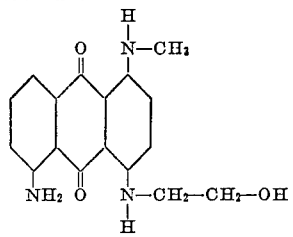

KARL KOEBERLE.
CHRISTIAN STEIGERWALD.
ROBERT SCHWEIZER.